US012609989B2

(12) United States Patent
Johansson

(10) Patent No.: US 12,609,989 B2
(45) Date of Patent: Apr. 21, 2026

(54) METHODS, EDGE COMPUTING CONTROL NODE, EDGE COMPUTING ASSISTANT NODE AND EDGE COMPUTING TERMINAL DEVICE FOR HANDLING INFORMATION IN A COMMUNICATION NETWORK

(71) Applicant: ProptechCore AB, Strangnas (SE)

(72) Inventor: Patrik Johansson, Strangnas (SE)

(73) Assignee: ProptechCore AB, Strangnas (SE)

( * ) Notice: Subject to any disclaimer, the term of this patent is extended or adjusted under 35 U.S.C. 154(b) by 1 day.

(21) Appl. No.: 18/723,544

(22) PCT Filed: Dec. 22, 2021

(86) PCT No.: PCT/SE2021/051307
§ 371 (c)(1),
(2) Date: Jun. 24, 2024

(87) PCT Pub. No.: WO2023/121525
PCT Pub. Date: Jun. 29, 2023

(65) Prior Publication Data
US 2025/0055914 A1      Feb. 13, 2025

(51) Int. Cl.
*H04L 12/24* (2006.01)
*H04L 41/0803* (2022.01)
*H04L 67/125* (2022.01)

(52) U.S. Cl.
CPC .................................. *H04L 67/125* (2013.01)

(58) Field of Classification Search
CPC ...... H04L 67/125; H04L 67/12; H04L 67/561
USPC ........................................................ 709/223
See application file for complete search history.

(56) References Cited

U.S. PATENT DOCUMENTS

| | | | |
|---|---|---|---|
| 11,533,235 B1 * | 12/2022 | Chitty ................. H04L 41/0823 |
| 2002/0055924 A1 * | 5/2002 | Liming ................. G01S 5/0027 |
| 2003/0212822 A1 * | 11/2003 | Saha ........................ H04L 61/00 |
| | | | 709/245 |

(Continued)

FOREIGN PATENT DOCUMENTS

EP          2660667 A2      11/2013

OTHER PUBLICATIONS

International Search Report of corresponding International Application No. PCT/SE2021/051307, dated Aug. 5, 2022, 3 pages.

*Primary Examiner* — El Hadji M Sall
*Assistant Examiner* — Elizabeth Kassa
(74) *Attorney, Agent, or Firm* — Tucker Ellis LLP

(57) ABSTRACT

Disclosed is a method performed by an edge computing control node, for handling information in a communication network, the communication network being deployed in a site and including the edge computing control node and one or more edge computing terminal device, the edge computing control node being able to communicate with the one or more edge computing terminal device. The method includes obtaining event information from an edge computing terminal device, the event information being partly contextualized by the edge computing terminal device, adding context to the obtained event information dynamically, so the event information becoming fully contextualized, determining one or more operation based on the fully contextualized event information, sending one or more operation instruction to the edge computing terminal device, and sending the fully contextualized event information to the edge computing terminal device for storing.

8 Claims, 10 Drawing Sheets

(56) References Cited

U.S. PATENT DOCUMENTS

| | | | | |
|---|---|---|---|---|
| 2009/0125584 A1* | 5/2009 | Agrawala | H04L 67/568 | |
| | | | | 709/203 |
| 2009/0131080 A1* | 5/2009 | Nadler | G06Q 30/0267 | |
| | | | | 455/456.3 |
| 2009/0157587 A1* | 6/2009 | Lim | G06N 5/046 | |
| | | | | 706/47 |
| 2010/0080368 A1* | 4/2010 | Erhart | H04L 67/306 | |
| | | | | 379/93.01 |
| 2010/0293543 A1* | 11/2010 | Erhart | H04W 8/18 | |
| | | | | 718/1 |
| 2013/0211559 A1* | 8/2013 | Lawson | H04L 67/12 | |
| | | | | 700/83 |
| 2014/0280138 A1* | 9/2014 | Li | G06F 16/00 | |
| | | | | 707/737 |
| 2014/0280529 A1* | 9/2014 | Davis | H04L 67/535 | |
| | | | | 709/204 |
| 2021/0200792 A1* | 7/2021 | Ploegert | G05B 13/0265 | |

* cited by examiner

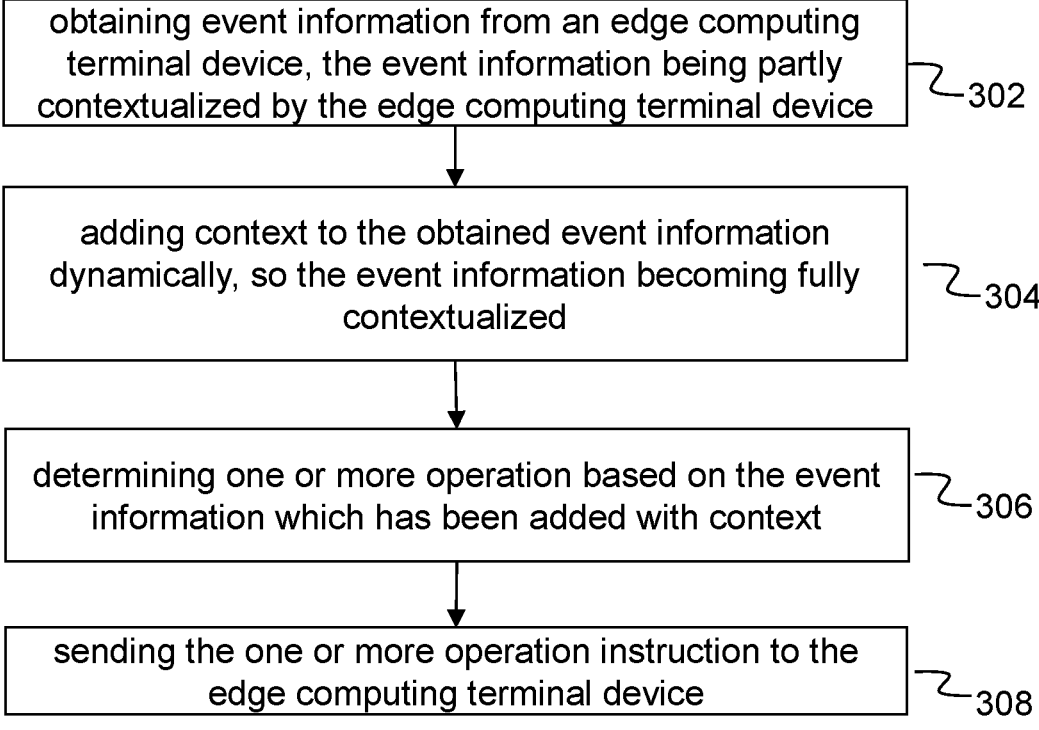

obtaining event information from an edge computing terminal device, the event information being partly contextualized by the edge computing terminal device —302 adding context to the obtained event information dynamically, so the event information becoming fully contextualized —304 determining one or more operation based on the event information which has been added with context —306 sending the one or more operation instruction to the edge computing terminal device —308

Fig. 3 creating a context structure ⁓402 storing the created context structure ⁓404 sending the stored context structure to the edge computing control node ⁓406

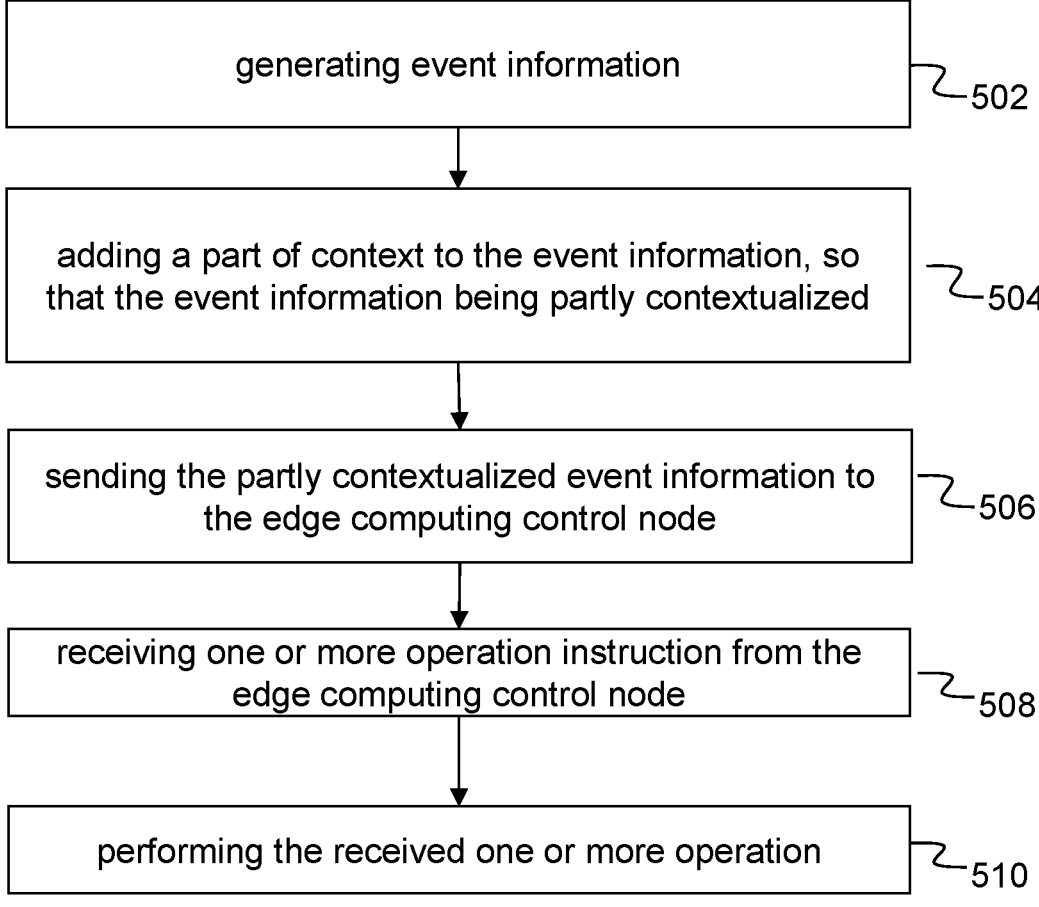

generating event information ⎰⎱502 adding a part of context to the event information, so that the event information being partly contextualized ⎰⎱504 sending the partly contextualized event information to the edge computing control node ⎰⎱506 receiving one or more operation instruction from the edge computing control node ⎰⎱508 performing the received one or more operation ⎰⎱510

Communication unit

601

603    Processor

604    Memory

605    Computer program

702

Communication unit

701

703    Processor

704    Memory

705    Computer program

METHODS, EDGE COMPUTING CONTROL NODE, EDGE COMPUTING ASSISTANT NODE AND EDGE COMPUTING TERMINAL DEVICE FOR HANDLING INFORMATION IN A COMMUNICATION NETWORK

This application is a national stage of International Application No. PCT/SE2021/051307, filed Dec. 22, 2021.

TECHNICAL FIELD

The present disclosure relates generally to methods, edge computing control node, edge computing assistant node and edge computing terminal device for handling information in a communication network. The present disclosure further relates to computer programs and carriers corresponding to the above methods, edge computing control node, edge computing assistant node and edge computing terminal device.

BACKGROUND

In a site such as a building, a premise, a campus, a city, or a similar location, a communication network can be deployed. The communication network can be any kind of wired or wireless communication network that providing communication between devices being deployed in the network. Multiple devices and a controller can be deployed in the communication network in the site so that the devices can be controlled and perform different functions.

Referring to FIG. 1, there are different terminal devices 110, 112, 114, 116, 118, 120 . . . deployed in a network in a site. The terminal devices can be e.g., different kinds of sensors and/or different kinds of actuators. The terminal devices measure different kinds of environment parameters in the site and performs different operations. All the terminal devices are connected in a communication network and controlled by a center controller 122. The center controller 122 collects all the sensed information uploaded by the terminal devices and control the operations of the terminal devices.

When this network is updated, for example, a new terminal device is being added to the network, or the new terminal device is replacing an old terminal device, or an old terminal device is upgraded, the network controller 122 should obtain context information of the new/upgraded terminal device. The context information includes device context, system context, spatial context, functional context, temporal context, and/or a combination of any one or more of these. But this context information is usually stored in user manual or description of the terminal device. A network operator may be needed to input/update the context information in the network controller 122 manually. As a result, the context information related to the new terminal device cannot be added in a timely and efficient manner. The newly added device is slowly integrated into the system and the efficiency of the whole system is negatively affected. Furthermore, many contexts are important data to the system and are useful for Artificial Intelligence (AI) training and analyzing. Since these contexts are stored in documents, it would be difficult or slow to fetch and input them to AI training or analyzing system.

Therefore a new method is needed, to control context information, in a smart and dynamic way.

SUMMARY

It is an object of the invention to address at least some of the problems and issues outlined above. It is possible to achieve these objects and others by using methods, network nodes and wireless communication devices as defined in the attached independent claims.

According to one aspect, a method performed by an edge computing control node, for handling information in a communication network is provided. The communication network is deployed in a site and comprises one or more edge computing terminal device. The edge computing control node is able to communicate with the one or more edge computing terminal device. The method comprises: obtaining event information from an edge computing terminal device, the event information being partly contextualized by the edge computing terminal device; adding context to the obtained event information dynamically, so the event information becoming fully contextualized. The method further comprises determining one or more operation based on the fully contextualized event information and sending one or more operation instruction to the edge computing terminal device, the one or more operation instruction comprising the determined one or more operation, so that the edge computing terminal device can perform the one or more operation, wherein the context comprises device context, system context, spatial context, functional context, temporal context, and/or a combination of any one or more of these.

According to another aspect, a method performed by an edge computing assistant node, for handling information in a communication network, is provided. The communication network is deployed in a site and comprises at least one edge computing control node and one or more edge computing terminal device, the edge computing assistant node is able to communicate with the edge computing control node. The method comprises: creating a context structure and storing the created context structure. The method further comprises sending the stored context structure to the edge computing control node, wherein the context comprises device context, system context, spatial context, functional context, temporal context, and/or a combination of any one or more of these.

According to another aspect, a method performed by an edge computing terminal device, for handling information in a communication network, is provided. The communication network is deployed in a site and comprising at least one edge computing control node, the edge computing terminal device is able to communicate with the edge computing control node. The method comprises generating event information and adding a part of context to the event information, so that the event information being partly contextualized. The method further comprises sending the partly contextualized event information to the edge computing control node and receiving one or more operation instruction from the edge computing control node, the one or more operation instruction comprising one or more operation, the one or more operation being determined by the edge computing control node. The method further comprises performing the one or more operation being comprised in the received one or more operation instruction, wherein the context comprises device context, system context, spatial context, functional context, temporal context, and/or a combination of any one or more these.

According to another aspect, an edge computing control node operable in a communication network, for handling information in a communication network, the communication network being deployed in a site and comprising one or more edge computing terminal device and the edge computing control node, the edge computing control node being able to communicate with the one or more edge computing terminal device, the edge computing control node comprising a communication unit, a processing circuitry and a memory, said memory containing instructions executable by said processing circuitry. The edge computing control node is operative for obtaining event information from an edge computing terminal device, the event information being partly contextualized by the edge computing terminal device, and adding context to the obtained event information dynamically, so the event information becoming fully contextualized. The edge computing terminal device is further operative for determining one or more operation based on the fully contextualized event information and sending one or more operation instruction to the edge computing terminal device, the one or more operation instruction comprising the determined one or more operation, so that the edge computing terminal device can perform the one or more operation, wherein the context comprises device context, system context, spatial context, functional context, temporal context, and/or a combination of any one or more of these.

According to another aspect, an edge computing assistant node is operable in a communication network, for handling information in a communication network. The communication network is deployed in a site and comprising the edge computing assistant node and at least one edge computing control node. The edge computing assistant node is able to communicate with the edge computing control node and the edge computing assistant node comprises a processing circuitry and a memory. The memory contains instructions executable by said processing circuitry, and the edge computing assistant node is operative for creating a context structure, storing the created context structure and sending the stored context structure to the edge computing control node, wherein the context comprises device context, system context, spatial context, functional context, temporal context, and/or a combination of any one or more of these.

According to another aspect, an edge computing terminal device is operable in a communication network, for handling information in the communication network. The communication network is deployed in a site and comprising at least one edge computing control node and the edge computing terminal device. The edge computing terminal device is able to communicate with the edge computing control node. The edge computing terminal device comprises a processing circuitry and a memory. The memory contains instructions executable by said processing circuitry. The edge computing terminal device is operative for generating event information and adding a part of context to the event information, so that the event information being partly contextualized. The edge computing terminal device is further operative for sending the partly contextualized event information to the edge computing control node and receiving one or more operation instruction from the edge computing control node, the one or more operation instruction comprising one or more operation, the one or more operation being determined by the edge computing control node. The edge computing terminal device is further operative for performing the one or more operation being comprised in the received one or more operation instruction, wherein the context comprises device context, system context, spatial context, functional context, temporal context, and/or a combination of any one or more of these.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which:

FIG. 3 is a flow chart illustrating a method performed by an edge computing control node, according to possible embodiments.

FIG. 5 is a flow chart illustrating a method performed by an edge computing terminal device, according to possible embodiments.

DETAILED DESCRIPTION

Figure 1:
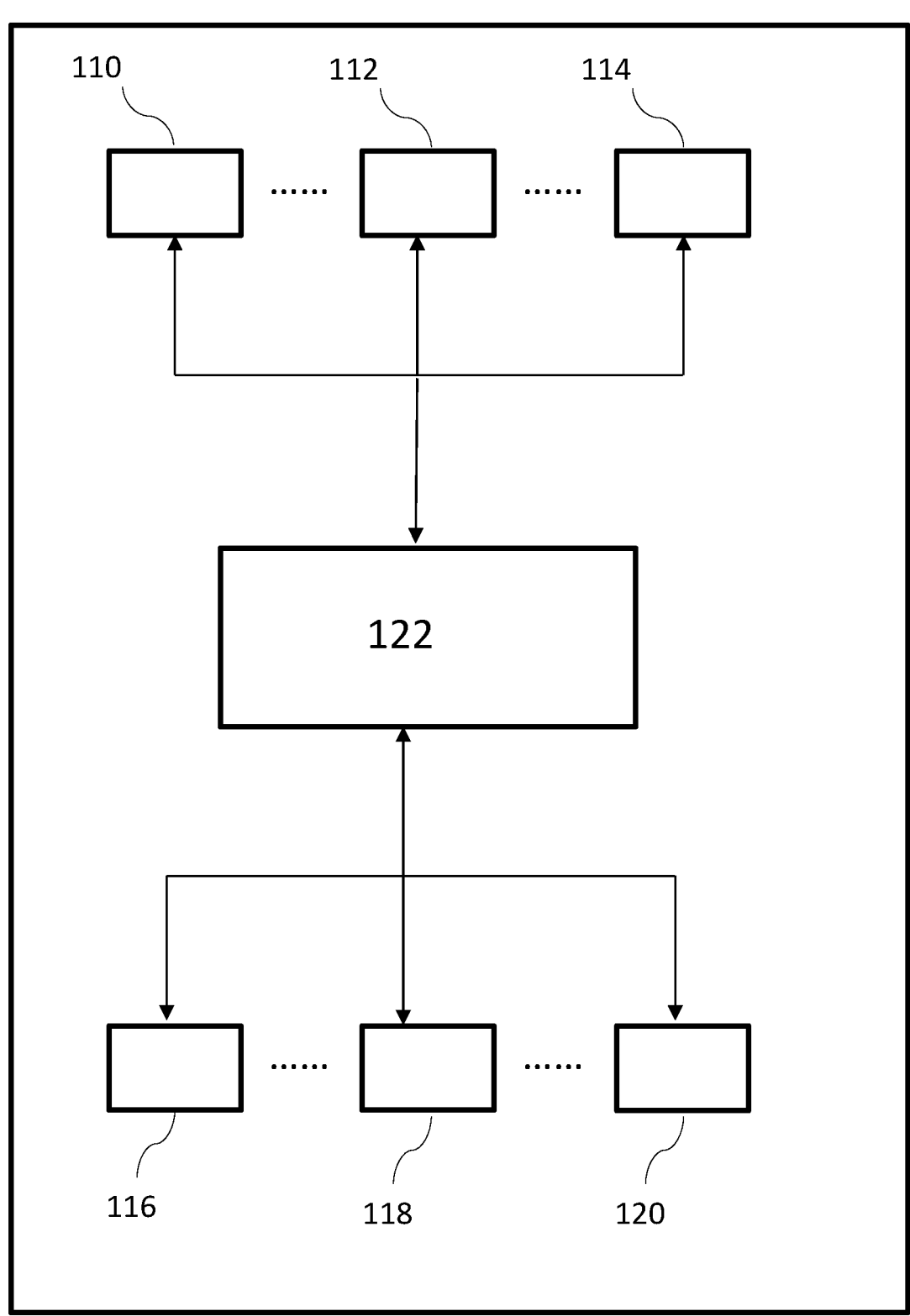
FIG. 1 is a schematic block diagram of a communication network in a site in the prior art.
Figure 2:
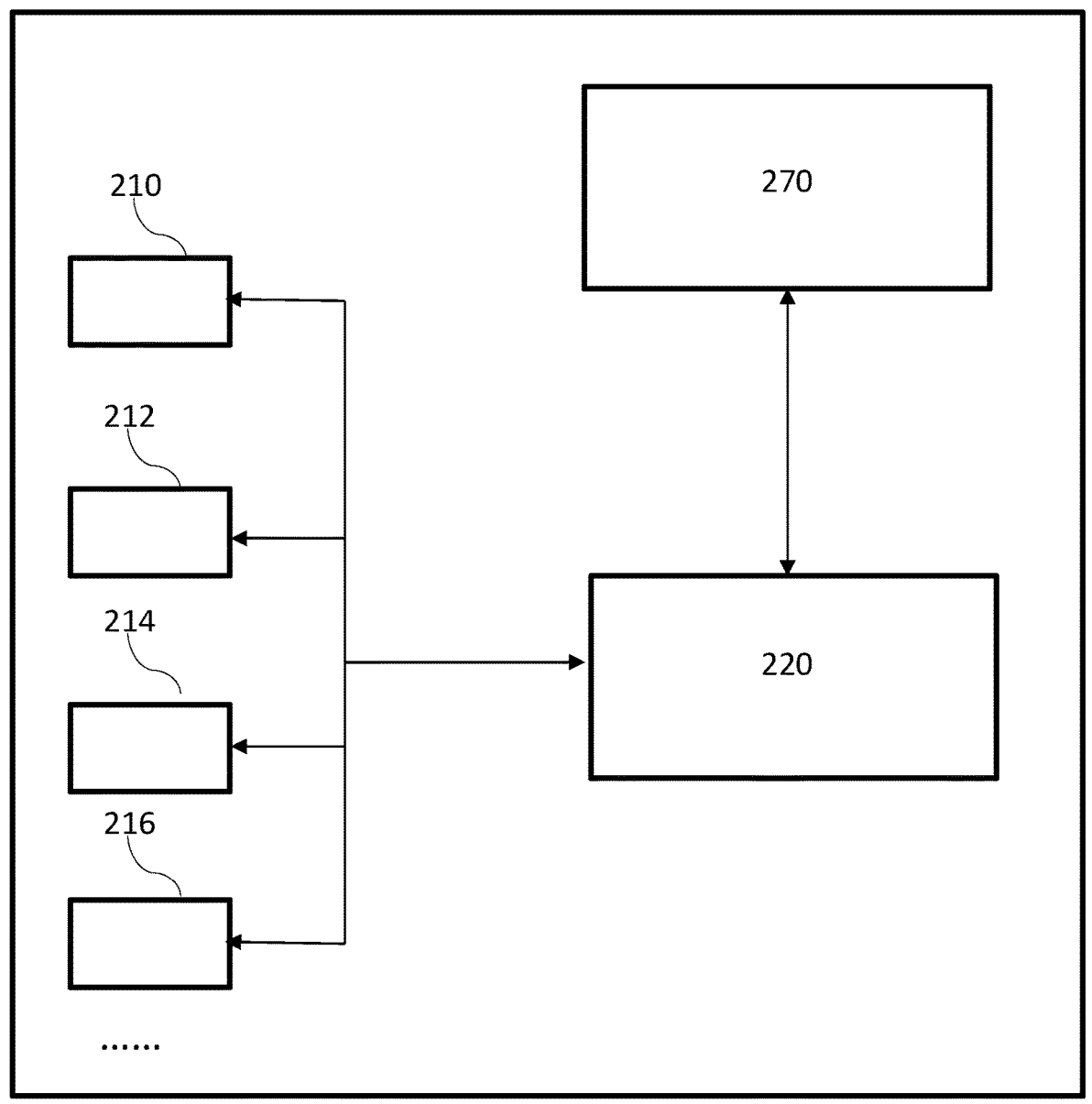
FIG. 2 is a schematic block diagram of a communication network according to possible embodiments.

This invention can be utilized in the communication network shown in FIG. 2. The communication network deployed in the site may be any kind of wired or wireless communication network that can provide access to edge computing control node 220, edge computing assistant node 270 and edge computing terminal devices 210, 212, 214, 216. Example of such wired communication networks are telephone network, cable television or internet access, and fiber-optic communication network. Example of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE) Frequency Division Duplex (FDD) and Time Division Duplex (TDD), LTE Advanced, Wireless Local Area Networks (WLAN), Worldwide Interoperability for Microwave Access (WiMAX), WIMAX Advanced, as well as 5G wireless communication networks based on technology such as New Radio (NR), or even future wireless network such as 6G or higher version. Unlicensed spectrum and protocol can also be used in the communication network, e.g., LoRA, LPWAN, Mioty, Sigfox, 6LoWPAN, MQTT, etc.

Edge computing is gaining a wider utilization in a variety of scenarios. Edge computing is a distributed computing paradigm that brings computation and data storage closer to the sources of data. Instead of performing computing in a network central node, edge computing brings the computing to edge nodes of the network. The edge nodes are close to the sources of the data and can perform computing in real time. This is expected to improve response times and save bandwidth. Edge computing is a network architecture and Internet of Things (IoT) is a typical use case instantiation of edge computing. The communication network in FIG. 2 utilizes an edge computing mechanism.

The edge computing control node 220 may be any kind of edge computing node that provides some kind of control to the number of edge computing terminal devices 210, 212, 214, 216, alone or in combination with another edge computing control node. The edge computing control node 220 may also be called control node 220 in this disclosure. The edge computing control node 220 performs management in the communication network it involves in. The edge computing control node 220 gathers information from the edge computing terminal devices 210, 212, 214, 216, performs calculation and analyzation, and sends control information to the edge computing terminal devices 210, 212, 214, 216. The edge computing control node 220 also interacts with the edge computing assistant node 270.

The number of edge computing terminal devices 210, 212, 214, 216. may be any type of device capable of communicating with an edge computing control node 220. The number of edge computing terminal devices 210, 212, 214, 216 may also be called terminal device or simply device in this disclosure. For example, the number of edge computing terminal devices 210, 212, 214, 216 may be a machine type terminal device or a terminal device capable of machine to machine (M2M) communication, a sensor, an actuator, a tablet, a mobile terminal, a laptop embedded equipped (LEE), a laptop mounted equipment (LME), a USB dongle, a Customer Premises Equipment (CPE) etc. The edge computing terminal device 210, 212, 214, 216 may also be an Internet of Things (IoT) device, Operational Technology (OT) system or subsystem, Building Information Modeling (BIM) system, and/or a combination of these.

The edge computing assistant node 270 may be any kind of edge computing node that provides some kind of assistant to the edge computing control node 22. The edge computing assistant node 270 may also be called assistant node 270 in this disclosure. The edge computing assistant node 270 performs assistant in the communication network it involves in. The edge computing assistant node 270 performs a two-way interaction with the edge computing control node 220. The edge computing assistant node 270 can be located in a cloud.

Figure 6:
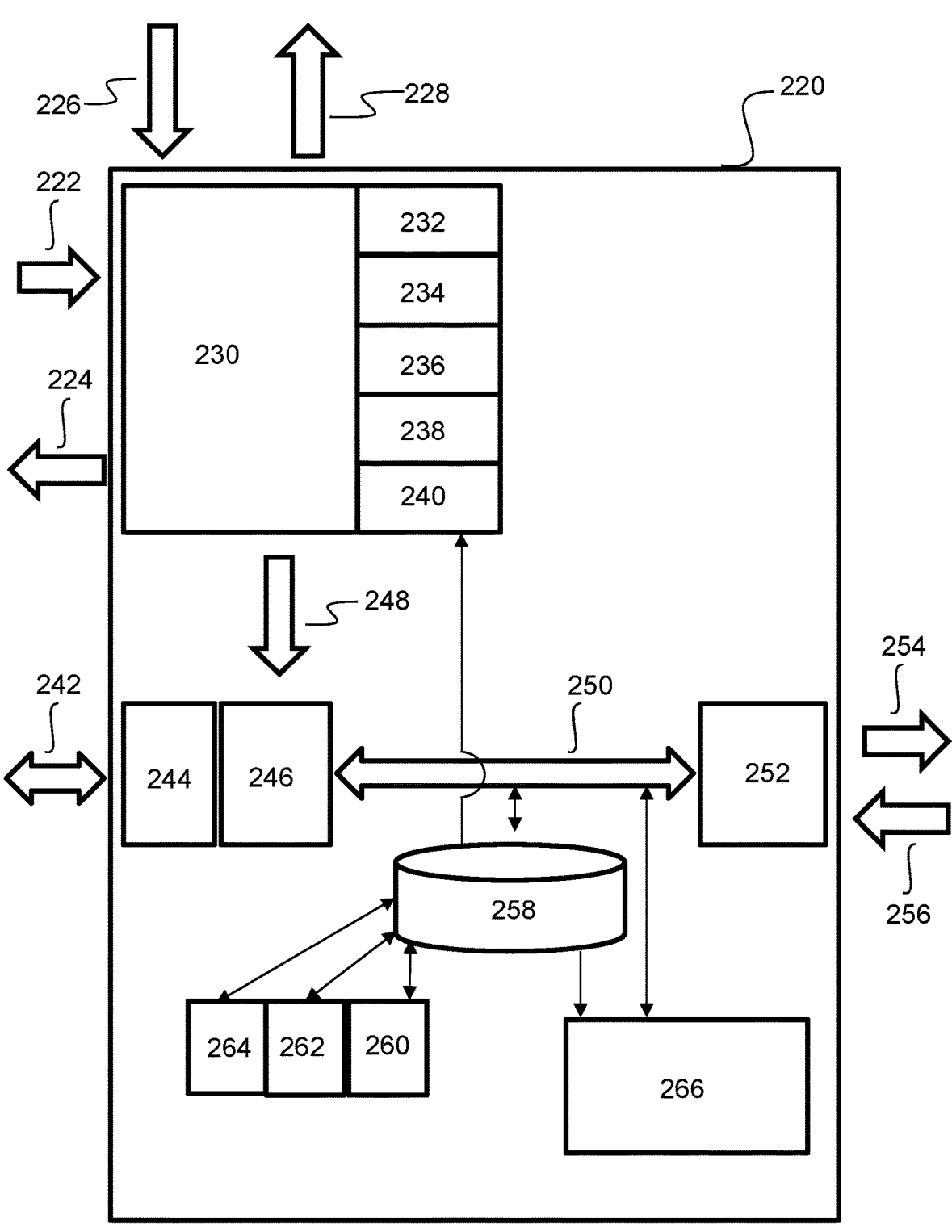
FIG. 6 is schematic block diagram of an edge computing control node, according to possible embodiments.

FIG. 3, in conjunction with FIG. 2 and FIG. 6, describes a method performed by an edge computing control node 220, for handling information in a communication network, the communication network being deployed in a site and comprising the edge computing control node 220 and one or more edge computing terminal device 210, 212, 214, 216, the edge computing control node 220 being able to communicate with the one or more edge computing terminal device 210, 212, 214, 216. The method comprising: obtaining 302 event information from an edge computing terminal device 210, the event information being partly contextualized by the edge computing terminal device 210; adding 304 context to the obtained event information dynamically, so the event information becoming fully contextualized; determining 306 one or more operation based on the fully contextualized event information; sending 308 one or more operation instruction to the edge computing terminal device 210, 212, 214, 216, the one or more operation instruction comprising the determined one or more operation, so that the edge computing terminal device can perform the one or more operation. The context comprises device context, system context, spatial context, functional context, temporal context, and/or a combination of any one or more of these.

The communication network can also include more than one edge computing control node 220. In step 302, the edge computing control node 220 obtains partly contextualized event information from edge computing terminal devices 210, 212, 214, 216. In step 304, the obtained partly contextualized event information is further added with context and being fully contextualized by the edge computing control node 220. The event information refers to the events that generated by the edge computing terminal devices 210, 212, 214, 216. For example, if the terminal device is a sensor, the event information can be the value it senses. If the terminal device is an actuator, e.g., a heater, the event information can be the instruction it receives from a person, e.g., the person located besides the heater. The instruction can be e.g., "turning on the heater". The event information can also include a timestamp.

The context comprises device context, system context, spatial context, functional context, temporal context, and/or a combination of these. Device context comprises related device/hardware information of the terminal device, for example, the hardware manufacturer, hardware type (sensor, actuator . . . ), device version, etc. System context comprises related system information of the terminal device, for example, the system name, type, developer, version, etc. Spatial context comprises related spatial/location information of the terminal device, for example, the site that the terminal device being deployed, the specific address and related spaces of the terminal device in the site (building, floor, room, space size, functional spaces, airflow spaces, energy zones, space volume, space 2D coordinates, space 3D coordinates . . . ), etc. Functional context comprises related function information of the terminal device, for example, sensing temperature/humidity/light intensity/CO2 etc. The target parameters of the terminal devices can also be the functional context, e.g., a target temperature of a heater. Working mode also belongs to the functional context, e.g., Heating, Cooling, Ventilation, Water, People Flow, Access, Security, Elevator, Heated Water, Electric System etc. Temporal context comprises accumulated time information, e.g., frequency of one event, total number of events, trends, sum of events, average over time etc. The term "contextualized" means that the raw event information is added with context. Partly contextualized means that the raw event information is added with part of the context, fully contextualized means that the raw event information is added with all the context.

In step 302, the event information sent by the terminal device is partly contextualized. The event information can be added with device context, system context, spatial context, functional context, and/or a combination of these. But the event information from the terminal device cannot be added with temporal context by the terminal device.

Taking a "room controller" as an example. The room controller is a terminal device, and the room controller is equipped with different kinds of sensors and actuators. The raw event information is: current temperature—22° C.; current humidity—50%. The terminal device adds a part of context to the event information, e.g., adds device context to the event information, so the event information is partly contextualized and looks like this: device manufacturer—Regin; device type—temperature and humidity sensor/actuator; device model—1A; device version—2.01; temperature—22° C.; current humidity—50%.

In step 304, the edge computing control node 220 adds all possible kinds of context information to the event information, so the event information is fully contextualized. In this example, the edge computing control node 220 adds the system, spatial, functional and temporal context to the partly contextualized event information, and the fully contextualized event information looks like this: device manufacturer—Regin; device type—temperature and humidity sensor/actuator; device model—1A; device version—2.01;

system—AS01; device location—room 307, floor 3, building A, campus X, city Y, country Z; function—sensing/controlling temperature and humidity, the target of temperature/humidity controlling is 23° C./55%; daytime average temperature in recent 24 h—22° C.; nighttime average temperature in recent 24 h—20° C.; current temperature—22° C.; current humidity—50%. Please note that all these event/contexts are just examples, the actual event/contexts are not limited to this and can be of many different kinds.

In step 306, one or more operation is determined by the edge computing control node 220 based on the fully contextualized event information. In the example above, according to the fully contextualized event information, the edge computing control node 220 determines that the heater in the room controller should be actuated to reach the target temperature, and the humidifier in the room controller should also be actuated to reach the target humidity. In step 308, the operation instructions are sent to the edge computing terminal device 210 and the terminal device 210 can actuate the heater and humidifier accordingly.

By this method, the event information from the terminal node 210, 212, 214, 216 is added with full context information automatically and dynamically. The system does not need any human operator to read into edge computing terminal device user manual and add the context information.

According to another embodiment, if the edge computing terminal device 210 is a BIM system, an intelligent type OT system/subsystem, and/or a combination of these, the edge computing control node 220 sends the fully contextualized event information to the terminal device 210, that is the room controller in this example, so that the room controller gets an overview of all the related information of itself.

According to another embodiment, the communication network further comprises an edge computing assistant node 270. The method further comprises obtaining the structure of context from the edge computing assistant node 270, before adding context to the event information dynamically. The method further comprises sending context structure updating information to the edge computing assistant node 270, so that the edge computing assistant node 270 can update the context structure accordingly. The context structure refers to the relationships between the contexts, e.g., in the form of a context graph and describes how the device, spatial, system, functional and temporal context relates to each other. For example, when a new device is added to the network, the structure of all kinds of context needs to be updated.

By this method, the context structure is stored/protected in a special place and updated by the edge computing control node 220 dynamically.

According to another embodiment, the method further comprises storing the fully contextualized event information in a database 258, the database 258 being an internal database of the edge computing control node 220. The method also comprises analyzing the fully contextualized event information stored in the database.

By this method, all the fully contextualized event information can be used as source information for a reliable analyzing. The overview and details of system behavior are revealed.

Referring to FIG. 6, an edge computing control node 220 is shown. The control node 220 receives raw event information from the terminal devices in 242. The raw event information received from 242 is inputted to southbound event broker 244. This southbound event broker 244 works as a specialized interface for receiving event information from terminal devices. Meanwhile, context added by the terminal device is received via 222. The received context is inputted to an event driven context broker 230. This event driven context broker 230 works as a specialized interface for receiving context. After receiving the context from the terminal device, the control node 220 add device context 232, system context 234, spatial context 236, functional context 238 and temporal 240 to the received context, so that the context information becomes complete now. Please note even if one kind of context information, e.g., functional context, already exists in the received context, the control node 220 can add further functional context 238 to the existing functional context, so that the functional context becomes complete.

Now the full context information is sent to an event contextualizer 246 as shown in the arrow 248. The received raw event information is being fully contextualized in the event contextualizer 246. The fully contextualized event information is sent to a time series internal database 258. The data in the database 258 can be used to make determinations on operations in a real time Artificial Intelligence (AI) insight engine 260 and/or a real time logic builder 264. The determined operations can be sent back to the terminal devices via arrow 242 and the fully contextualized event information is also sent back to the terminal device, but the context being sent via the event driven context broker 230 and arrow 224, and the event information being sent via the southbound event broker 244 and arrow 242.

The data in the database 258 can also be used in a real time analyzer 262, so the behavior mode of the terminal device is revealed. The real time analyzer 262 even provides a user interface to a person, so that the person can have two-way interaction with the real time analyzer 262. The person can also input one or more operation for the edge computing terminal device 210. The one or more operation is inputted via the real time analyzer user interface, transmitted via 242 and performed by the edge computing terminal device 210. The fully contextualized event information in 250, the data in the database 258, the determined operations in 260, and the analysis results 262, can be transmitted to a third-party application 266 so that further utilization of these data can be performed. The fully contextualized event information can also be transmitted to external applications via a northbound event broker 252, so that external applications can further utilize these data. The external applications can be locally located in the site network environment, or remotely located in private or public cloud. The database 258 can also update the temporal context 240. Since the database 258 is a time series database, for example a trend of the event information can be obtained. This trend of the event information can be used to update the temporal context 240. An MQTT protocol can be used in the control node 220 and the communication network around it, so a publish/subscribe mechanism is used when transmitting/receiving data. Of course, other transmission protocol can also be used.

Figure 4:
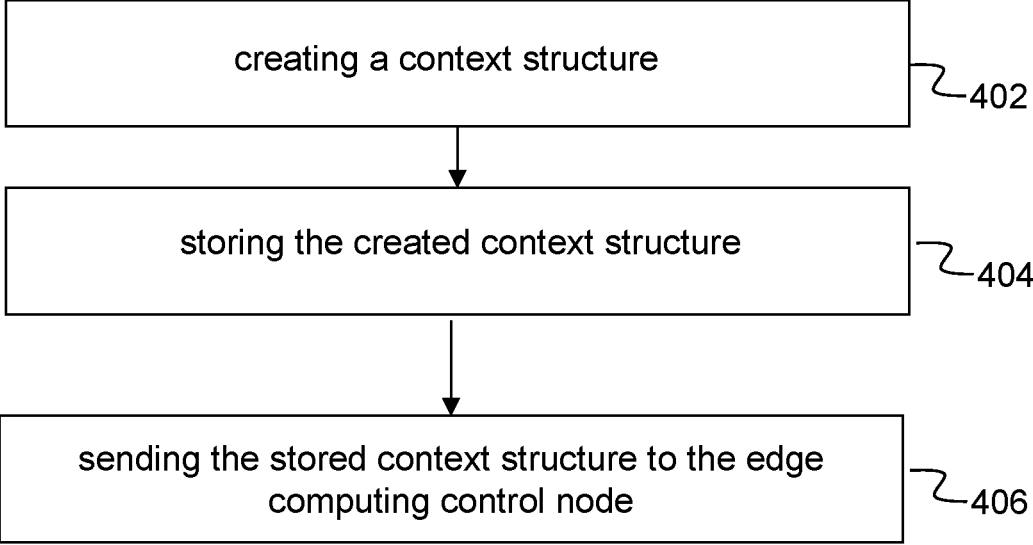
FIG. 4 is a flow chart illustrating a method performed by an edge computing assistant node, according to possible embodiments.
Figure 7:
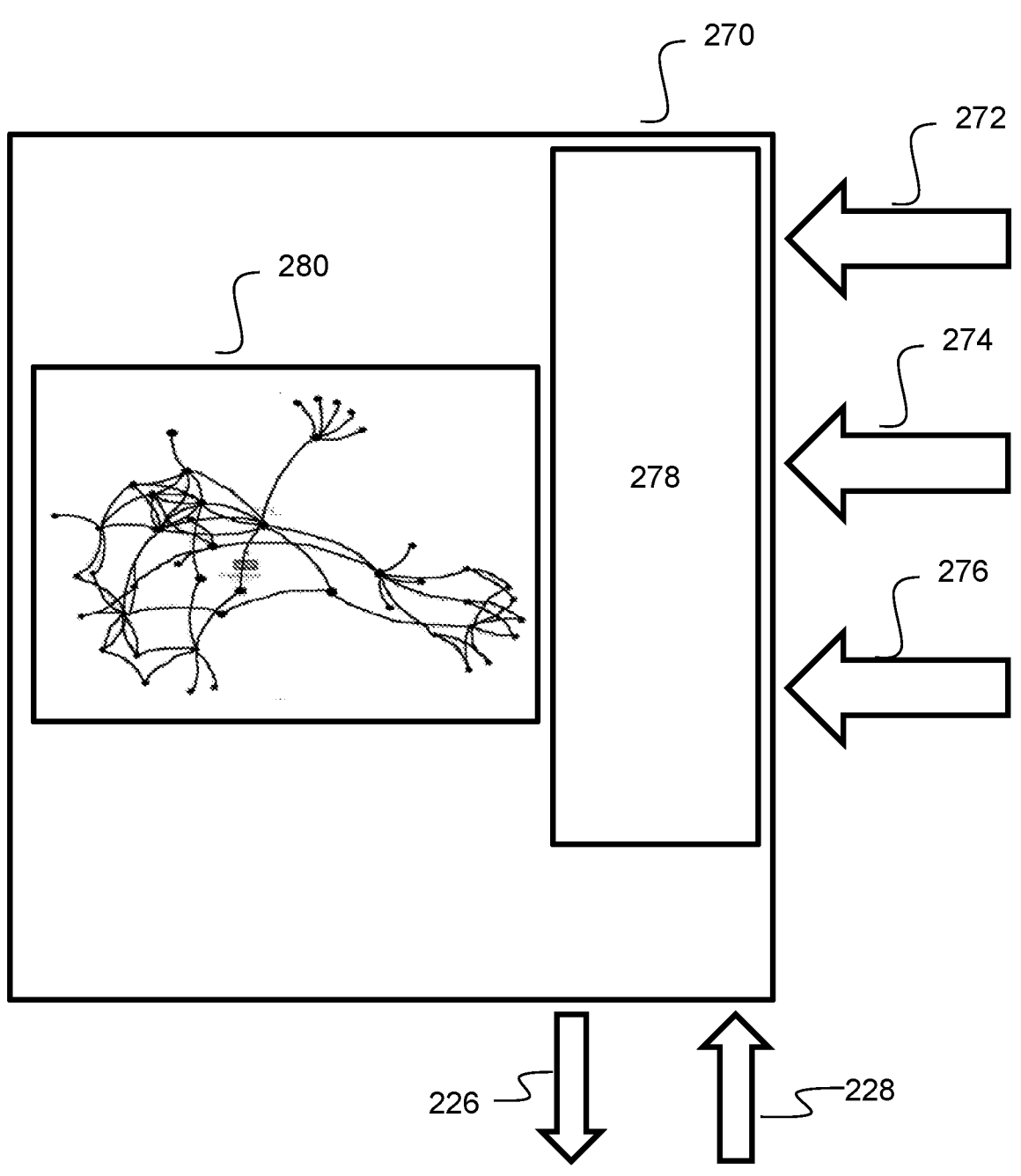
FIG. 7 is schematic block diagram of an edge computing assistant node, according to possible embodiments.

FIG. 4, in conjunction with FIG. 2 and FIG. 7, describes a method performed by an edge computing assistant node 270, for handling information in a communication network. The communication network is deployed in a site and comprising the edge computing assistant node 270 and at least one edge computing control node 220 and one or more edge computing terminal device 210, 212, 214, 216, the edge computing assistant node 270 being able to communicate with the edge computing control node 220. The method comprising: creating 402 a context structure; storing 404 the created context structure and sending 406 the stored context structure to the edge computing control node 220, wherein the context comprises device context, system context, spatial context, functional context, temporal context, and/or a combination of these.

The communication network can also include more than one edge computing assistant node 270. In step 402, the context structure can be created by a site environment owner/manager 272, a terminal device installer/integrator 274 and/or a terminal device manufacturer 276. These parties create a shared context structure with a context designer 278 in an ecosystem driven approach, which means every party make its own contribution when creating the shared context structure. The context designer 278 is a tool that is used for creating a context structure, e.g., a software in the assistant node 270.

By this method, the context structure is created and stored in a special place, so that the context structure is protected and updated when needed.

According to another embodiment, the context structure is in the form of a context graph. The context graph is a graphical data structure, which shows the structure of the context. An example of the context graph is shown in 280 in FIG. 7.

According to another embodiment, the method further comprises receiving context structure updating information from the edge computing control node 220 and updating the stored context structure when receiving the context structure updating information from the edge computing control node 220.

By this method, the context structure is updated dynamically.

Referring to FIG. 7, an edge computing assistant node 270 is shown. The assistant node 270 comprises a context designer 278. The site environment owner/manager 272, terminal device installer/integrator 274 and/or terminal device manufacturer 276 use the context designer 278 to create the context graph 280. The context graph 280 clearly and explicitly shows the context structure. The assistant node 270 sends the context graph 280 to the edge computing control node 220 via interface the 226 and receives the updating information from the control node 220 via the interface 228.

Figure 8:
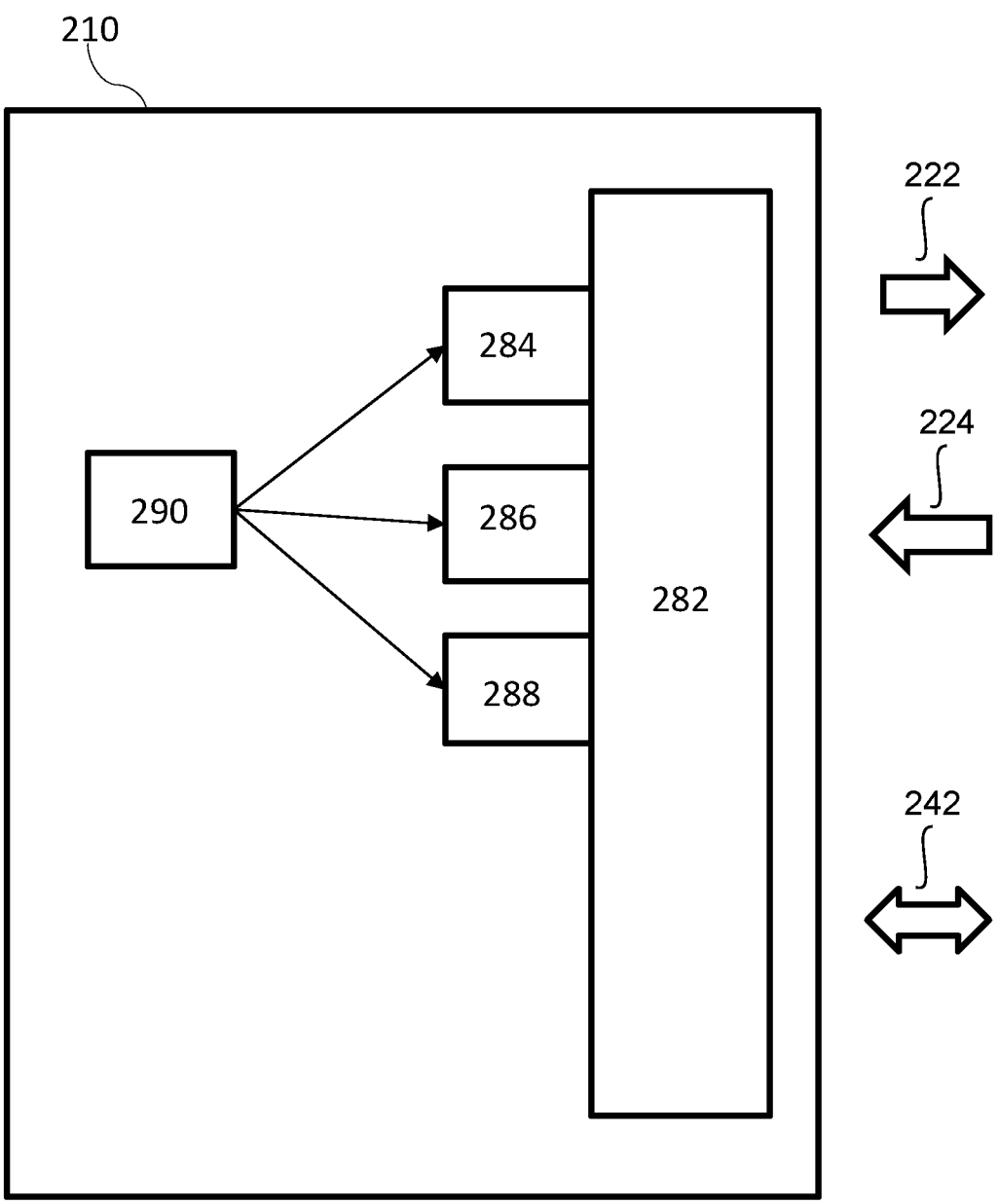
FIG. 8 is schematic block diagram of an edge computing terminal device, according to possible embodiments.

FIG. 5, in conjunction with FIG. 2 and FIG. 8, shows a method performed by an edge computing terminal device 210, for handling information in a communication network. The communication network is deployed in a site and comprises at least one edge computing control node 220 and the edge computing terminal device 210, the edge computing terminal device 210 is able to communicate with the edge computing control node 220. The method comprises: generating 502 event information and adding 504 a part of context to the event information, so that the event information being partly contextualized. The method further comprises sending 506 the partly contextualized event information to the edge computing control node 220 and receiving 508 one or more operation instruction from the edge computing control node 220, the one or more operation instruction comprising one or more operation, the one or more operation being determined by the edge computing control node 220. The method further comprises performing 510 the one or more operation being comprised in the received 508 one or more operation instruction, wherein the context comprises device context, system context, spatial context, functional context, temporal context, and/or a combination of any of these.

The communication network can also include more than one edge computing terminal device, as shown in FIG. 2. In the step 504, the adding of the part of context including adding device context, system context, spatial context, functional context, and/or a combination of these. The temporal context is excluded from this part of context.

According to another embodiment, the communication network further comprising at least one edge computing assistant node 270, the method further comprises obtaining the structure of context from the edge computing assistant node 270 via the edge computing control node 220 and sending context structure updating information to the edge computing assistant node 270 via the edge computing control node 220, so that the edge computing assistant node 270 can update the context structure accordingly.

According to another embodiment, if the edge computing terminal device 210 is a BIM system and/or an intelligent type of an OT system/subsystem, the edge computing terminal device 210 receives the fully contextualized event information from the edge computing control node 220 and stores the received fully contextualized event information.

Referring to FIG. 8, an edge computing terminal device 210 is shown. The terminal device 210 can be an IoT device 284, an OT system/subsystem 286, BIM system, and/or a combination of any of one or more of these. The code of these device/system can be stored locally, or stored remotely in the cloud. The device/system sends context to the edge computing control node 220 via the interface 222, receives context from the edge computing control node 220 via the interface 224, sends/receives event information to/from the edge computing control node 220 via the interface 242. A context generator 290 can be used to add a part of context to the device/system. As explained before, the part of context comprises device context, system context, spatial context, functional context, and/or a combination of these.

Figures 9, 10:
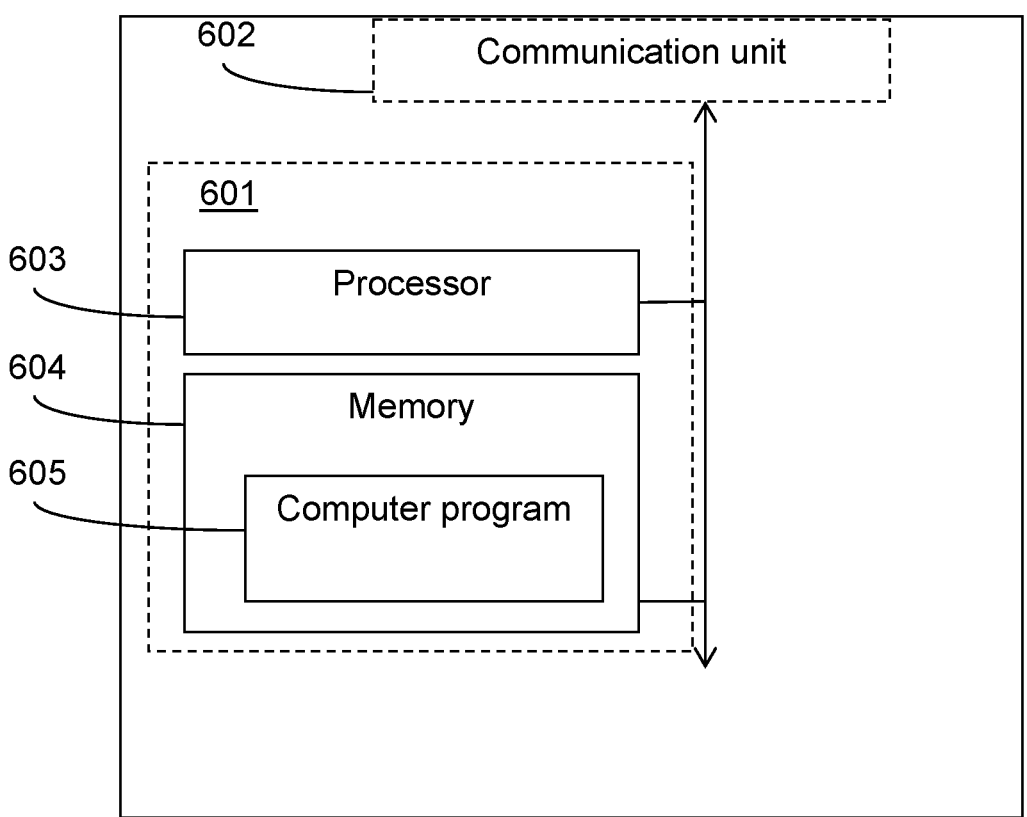
FIG. 9 is a block diagram illustrating an edge computing control node in more detail, according to further possible embodiments.
FIG. 10 is a block diagram illustrating an edge computing assistant node in more detail, according to further possible embodiments.
Figure 11:
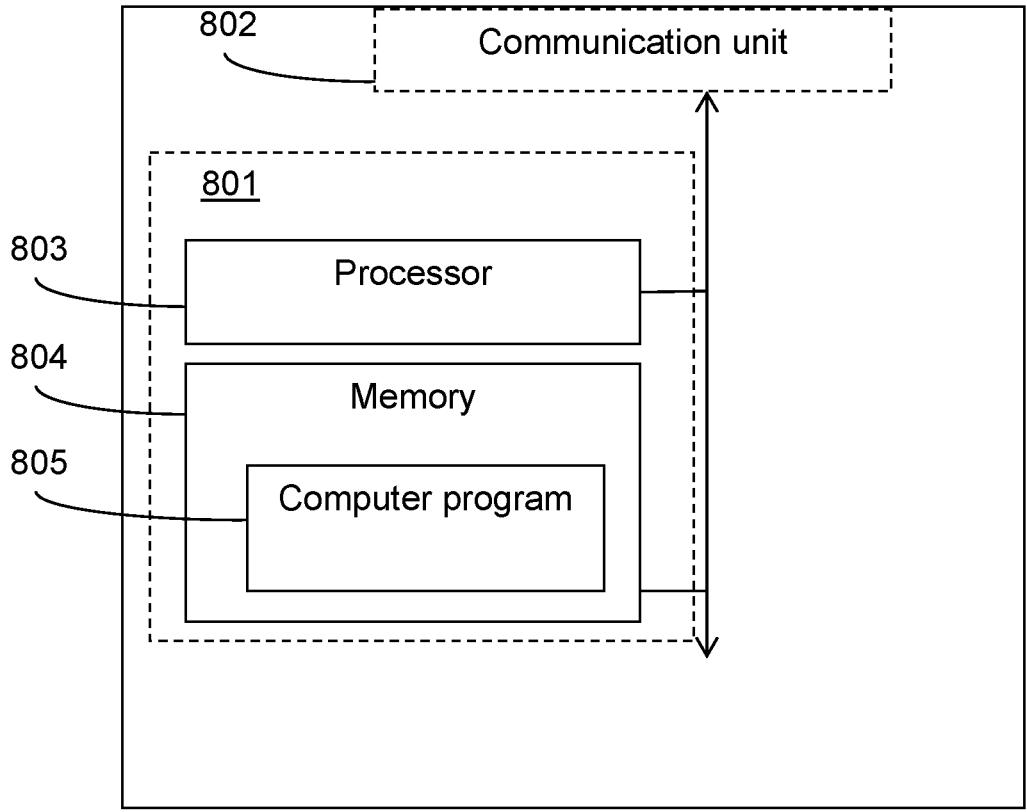
FIG. 11 is a block diagram illustrating an edge computing terminal device in more detail, according to further possible embodiments.

FIG. 9 describes a block diagram of an edge computing control node 220 operable in a communication network, for handling information in a communication network. The communication network is deployed in a site and comprising one or more edge computing terminal device 210, 212, 214, 216, the edge computing control node 220 is able to communicate with the one or more edge computing terminal device 210, 212, 214, 216. The edge computing control node 220 comprises a communication unit 602, a processing circuitry 603 and a memory 604. The memory 604 contains instructions executable by said processing circuitry 603, and the edge computing control node 220 is operative for: obtaining event information from an edge computing terminal device 210, 212, 214, 216, the event information being partly contextualized by the edge computing terminal device 210, 212, 214, 216 and adding context to the obtained event information dynamically, so the event information becoming fully contextualized. The edge computing control node 220 is further operative for determining one or more operation based on the fully contextualized event information and sending one or more operation instruction to the edge computing terminal device 210, 212, 214, 216, the one or more operation instruction comprising the determined one or more operation, so that the edge computing terminal device 210, 212, 214, 216 can perform the one or more operation, wherein the context comprises device context, system context, spatial context, functional context, temporal context, and/or a combination of these.

According to another embodiment, the communication network further comprises an edge computing assistant node 270, the edge computing control node 220 is further operative for obtaining the structure of context from the edge computing assistant node 270, before adding 304 context to the event information dynamically and sending context structure updating information to the edge computing assistant node 270, so that the edge computing assistant node 270 can update the context structure accordingly.

According to another embodiment, the edge computing control node 220 is further operative for storing the fully contextualized event information in a database 258, the database 258 being an internal database of the edge computing control node 220 and analysing the fully contextualized event information stored in the database 258.

According to other embodiments, the edge computing control node 220 may further comprise a communication unit 602, which may be considered to comprise conventional means for communication with other devices in the communication network, such as a transceiver for wireless transmission and reception of signals. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause edge computing control node 220 to perform the steps described in any of the described embodiments of the edge computing control node 220 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). In some embodiments, a carrier may contain the computer program 605. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 604. Alternatively, the computer program may be stored on a server or any other entity to which the edge computing control node 220 has access via the communication unit 602. The computer program 605 may then be downloaded from the server into the memory 604.

FIG. 10 describes a block diagram of an edge computing assistant node 270 operable in a communication network, for handling information in a communication network. The communication network is deployed in a site and comprising the edge computing assistant node 270 and at least one edge computing control node 220. The edge computing assistant node 270 is able to communicate with the edge computing control node 220. The edge computing assistant node 270 comprises a processing circuitry 703 and a memory 704, said memory 704 containing instructions executable by said processing circuitry 703. The edge computing assistant node 270 is operative for creating a context structure, storing the created context structure and sending the stored context structure to the edge computing control node 220, wherein the context comprises device context, system context, spatial context, functional context, temporal context, and/or a combination of these.

According to another embodiment, the context structure is in the form of a context graph.

According to another embodiment, the edge computing assistant node 270 is further operative for receiving context structure updating information from the edge computing control node 220 and updating the stored context structure when receiving the context structure updating information from the edge computing control node 220.

According to other embodiments, the edge computing assistant node 270 may further comprise a communication unit 702, which may be considered to comprise conventional means for communication with other devices in the communication network, such as a transceiver for wireless transmission and reception of signals. The instructions executable by said processing circuitry 703 may be arranged as a computer program 705 stored e.g. in said memory 704. The processing circuitry 703 and the memory 704 may be arranged in a sub-arrangement 701. The sub-arrangement 701 may be a micro-processor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions.

The computer program 705 may be arranged such that when its instructions are run in the processing circuitry, they cause the edge computing assistant node 270 to perform the steps described in any of the described embodiments of the edge computing assistant node 270 and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). In some embodiments, a carrier may contain the computer program 705. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 704. Alternatively, the computer program may be stored on a server or any other entity to which the edge computing assistant node 270 has access via the communication unit 702. The computer program 705 may then be downloaded from the server into the memory 704.

FIG. 10 describes a block diagram of an edge computing terminal device 210 being operable in a communication network, for handling information in the communication network. The communication network is deployed in a site and comprising at least one edge computing control node 220 and the edge computing terminal device 210. The edge computing terminal device 210 is able to communicate with the edge computing control node 220. The edge computing terminal device 210 comprises a processing circuitry 803 and a memory 804, said memory 804 containing instructions executable by said processing circuitry 803. The edge computing terminal device 210 is operative for generating event information, adding a part of context to the event information, so that the event information being partly contextualized and sending the partly contextualized event information to the edge computing control node 220. The edge computing terminal device 210 is further operative for receiving one or more operation instruction from the edge computing control node 220, the one or more operation instruction comprising one or more operation, the one or more operation being determined by the edge computing control node 220. The edge computing terminal device 210 is further operative for performing the one or more operation being comprised in the received one or more operation instruction, wherein the context comprises device context, system context, spatial context, functional context, temporal context, and/or a combination of these.

According to another embodiment, the communication network further comprising at least one edge computing assistant node 270, the edge computing terminal device 210 is further operative for obtaining the structure of context from the edge computing assistant node 270 via the edge computing control node 220 and sending context structure updating information to the edge computing assistant node 270 via the edge computing control node 220, so that the edge computing assistant node 270 can update the context structure accordingly.

According to other embodiments, the edge computing terminal device 210 may further comprise a communication unit 802, which may be considered to comprise conventional means for communication with other devices in the communication network, such as a transceiver for wireless transmission and reception of signals. The instructions executable by said processing circuitry 803 may be arranged as a computer program 805 stored e.g. in said memory 804. The processing circuitry 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the methods mentioned above. The processing circuitry 803 may comprise one or more programmable processor, application-specific integrated circuits, field programmable gate arrays or combinations of these adapted to execute instructions.

The computer program 805 may be arranged such that when its instructions are run in the processing circuitry, they cause the edge computing terminal device 210 to perform the steps described in any of the described embodiments of the edge computing terminal device 210 and its method. The computer program 805 may be carried by a computer program product connectable to the processing circuitry 803. The computer program product may be the memory 804, or at least arranged in the memory. The memory 804 may be realized as for example a RAM (Random-access memory), ROM (Read-Only Memory) or an EEPROM (Electrical Erasable Programmable ROM). In some embodiments, a carrier may contain the computer program 805. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 804. Alternatively, the computer program may be stored on a server or any other entity to which the edge computing terminal device 210 has access via the communication unit 802. The computer program 805 may then be downloaded from the server into the memory 804.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." Further, the term "a number of", such as in "a number of wireless devices" signifies one or more devices. All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. An edge computing control node operable in a communication network, for handling information in a communication network, the communication network being deployed in a site and comprising one or more edge computing terminal device and the edge computing control node, the edge computing control node being able to communicate with the one or more edge computing terminal device, the edge computing control node comprising a communication unit, a processing circuitry and a memory, said memory containing instructions executable by said processing circuitry, whereby the edge computing control node is operative for:

obtaining event information from an edge computing terminal device, the event information being partly contextualized by the edge computing terminal device;

adding context to the obtained event information dynamically, so the event information becomes fully contextualized, wherein the context comprises device context, system context, spatial context, functional context, and temporal context, and wherein the event information becomes fully contextualized after the addition of the device context, the system context, the spatial context, the functional context, and the temporal context;

determining one or more operation based on the fully contextualized event information; and sending one or more operation instruction to the edge computing terminal device, the one or more operation instruction comprising the determined one or more operation, so that the edge computing terminal device can perform the one or more operation.

2. The edge computing control node as claimed in claim 1, wherein the communication network further comprises an edge computing assistant node, the edge computing control node is further operative for:

obtaining the structure of context from the edge computing assistant node, before adding context to the event information dynamically; and sending context structure updating information to the edge computing assistant node, so that the edge computing assistant node can update the context structure accordingly.

3. The edge computing control node as claimed in claim 1, wherein the edge computing control node is further operative for:

storing the fully contextualized event information in a database, the database being an internal database of the edge computing control node; and analyzing the fully contextualized event information stored in the database.

4. An edge computing assistant node operable in a communication network, for handling information in a communication network, the communication network being deployed in a site and comprising the edge computing assistant node and at least one edge computing control node, the edge computing assistant node being able to communicate with the edge computing control node, the edge computing assistant node comprising a processing circuitry and a memory, said memory containing instructions executable by said processing circuitry, whereby the edge computing assistant node is operative for:

creating a context structure, wherein the context comprises device context, system context, spatial context, functional context, and temporal context, and wherein each part of context, the device context, system context, spatial context, functional context, and temporal context may be added to event information to fully contextualize the event information;

storing the created context structure; and sending the stored context structure to the edge computing control node.

5. The edge computing assistant node as claimed in claim 4, wherein the context structure is in the form of a context graph.

6. The edge computing assistant node as claimed in claim 4, wherein the edge computing assistant node is further operative for:

receiving context structure updating information from the edge computing control node; and updating the stored context structure when receiving the context structure updating information from the edge computing control node.

7. An edge computing terminal device being operable in a communication network, for handling information in the communication network, the communication network being deployed in a site and comprising at least one edge computing control node and the edge computing terminal device, the edge computing terminal device being able to communicate with the edge computing control node, the edge computing terminal device comprising a processing circuitry and a memory, said memory containing instructions executable by said processing circuitry, whereby the edge computing terminal device is operative for:

generating event information;

adding a part of context to the event information, so that the event information being partly contextualized, wherein context comprises device context, system context, spatial context, functional context, and temporal context, and wherein the event information becomes fully contextualized upon receiving device context, the system context, the spatial context, the functional context, and the temporal context;

sending the partly contextualized event information to the edge computing control node to fully contextualize the event information;

receiving one or more operation instruction from the edge computing control node, the one or more operation instruction comprising one or more operation, the one or more operation being determined by the edge computing control node; and performing the one or more operation being comprised in the received one or more operation instruction.

8. The edge computing terminal device as claimed in claim 7, wherein the communication network further comprising at least one edge computing assistant node, the edge computing terminal device is further operative for:

obtaining the structure of context from the edge computing assistant node via the edge computing control node; and sending context structure updating information to the edge computing assistant node via the edge computing control node, so that the edge computing assistant node can update the context structure accordingly.

* * * * *